(No Model.)  2 Sheets—Sheet 1.

T. D. LINES.
SPRING VEHICLE.

No. 478,937. Patented July 12, 1892.

Witnesses:
Emil Neuhart
C. F. Geyer

Thomas D. Lines, Inventor.
By Wilhelm & Bonner
Attorneys.

(No Model.) 2 Sheets—Sheet 2.
T. D. LINES.
SPRING VEHICLE.
No. 478,937. Patented July 12, 1892.
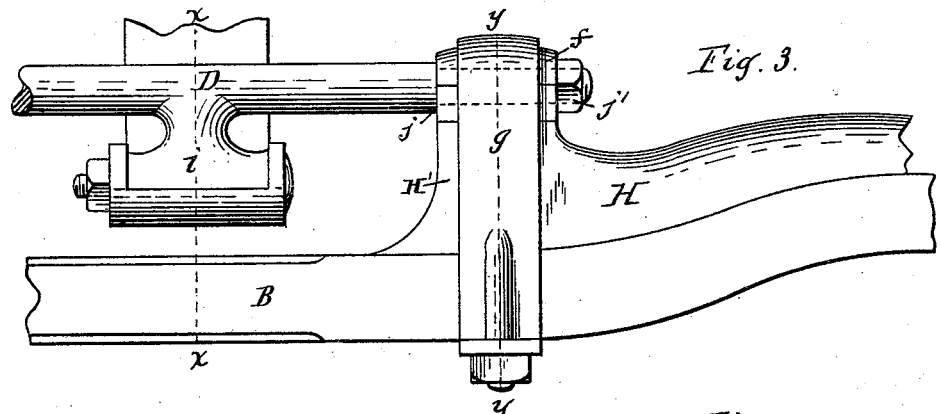
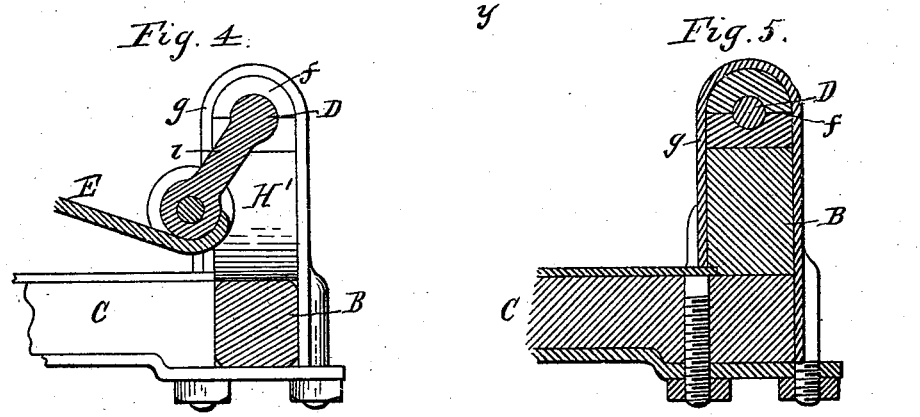
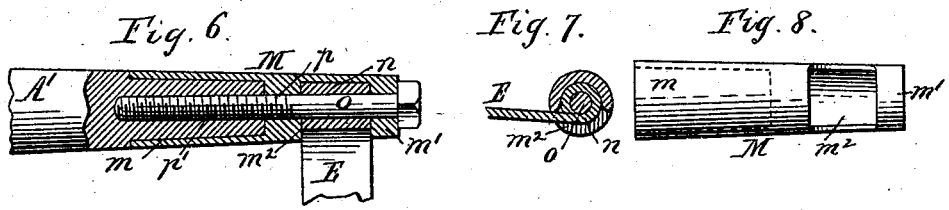
Witnesses:
Emil Neuhart
C. F. Geyer
Thomas D. Lines, Inventor.
By Wilhelm & Bonner, Attorneys.

UNITED STATES PATENT OFFICE.

THOMAS D. LINES, OF SYRACUSE, NEW YORK, ASSIGNOR TO CHARLES A. DENISON, OF SAME PLACE.

SPRING-VEHICLE.

SPECIFICATION forming part of Letters Patent No. 478,937, dated July 12, 1892.

Application filed March 31, 1891. Serial No. 387,140. (No model.)

*To all whom it may concern:*

Be it known that I, THOMAS D. LINES, a citizen of the United States, residing at Syracuse, in the county of Onondaga and State of New York, have invented a new and useful Improvement in Spring-Vehicles, of which the following is a specification.

This invention relates, chiefly, to the class of vehicles termed "side-spring wagons," and in which the side springs are hung on an equalizing-bar, which causes the springs to operate nearly or quite in unison, and thus obviates undue lateral swaying of the body of the vehicle.

The object of the invention is to produce a vehicle of the class aforesaid which shall carry the body in a low and conveniently-accessible position and at the same time present a neat and compact appearance and allow ample longitudinal distensions of the springs when subjected to a load without unduly straining the axle and shall have said axle thoroughly braced, and thus permit it to be formed of a slender, light, and neat-appearing bar; and to that end it consists in the improved construction and combination of parts hereinafter fully described, and specifically set forth in the claims.

Figure 1:
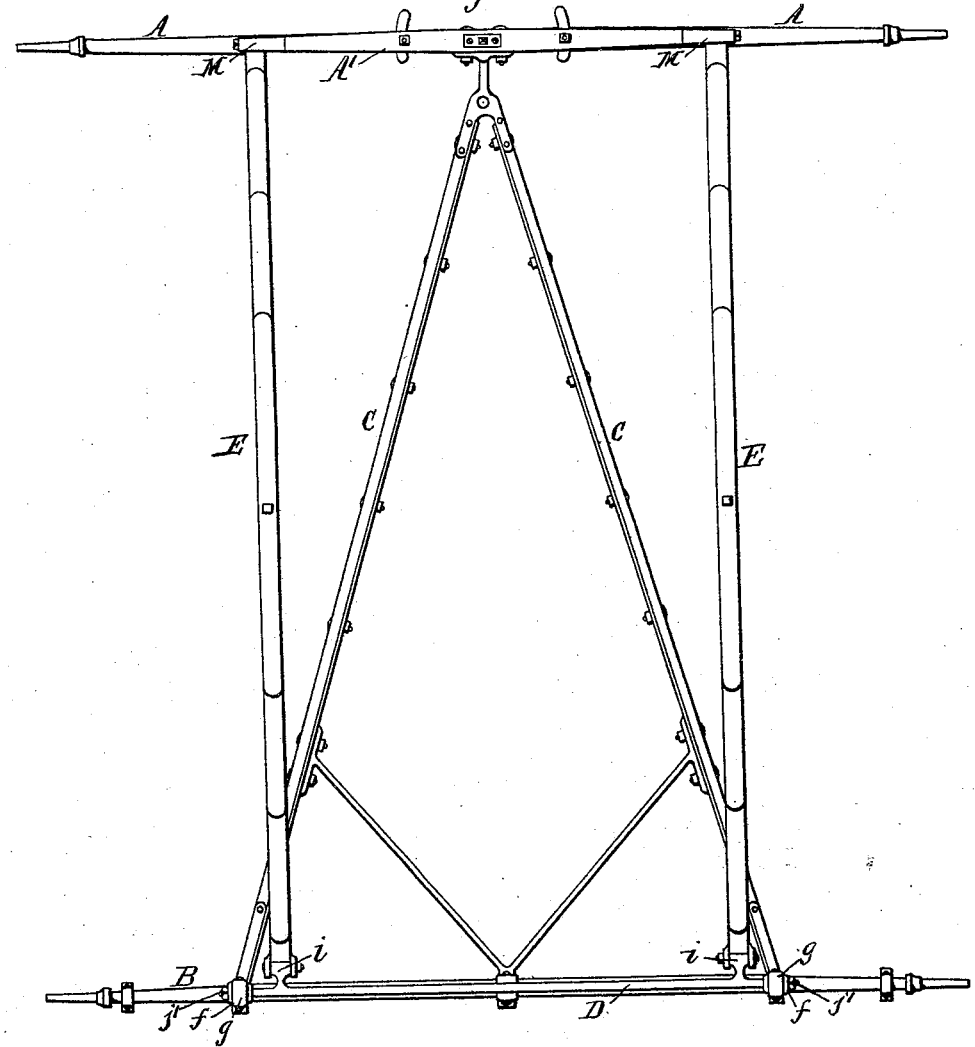
Figure 2:
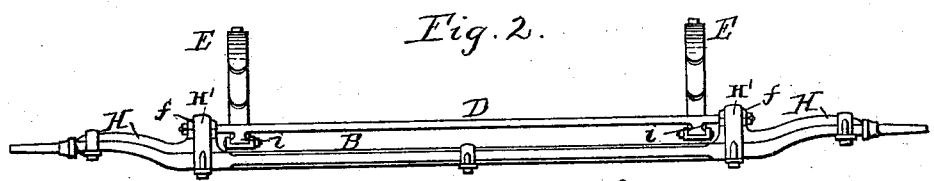

In the accompanying drawings, consisting of two sheets, Figure 1 is a top plan view of my improved running-gear. Fig. 2 is a rear view thereof. Fig. 3 is a fragmentary rear view of the same on an enlarged scale. Fig. 4 is a fragmentary longitudinal section in line $x\,x$, Fig. 3. Fig. 5 is a cross-section in line $y\,y$, Fig. 3, of one of the bearings in which the equalizing-bar turns. Fig. 6 is a fragmentary longitudinal section of the front bolster, showing the ferrule for attaching the front ends of the side springs to the bolster. Fig. 7 is a cross-section of the same. Fig. 8 is a bottom plan view of the ferrule. Fig. 9 is a rear elevation of a modification of my invention in which the equalizing-bar is arranged underneath the axle.

Like letters of reference refer to like parts in the several figures.

A represents the front axle, and A' the bolster mounted on said axle in the usual manner.

B denotes the rear axle, and C the double reach connecting the front and rear axles.

D is the equalizing-bar, and E E are the longitudinal side springs extending from the front bolster to the equalizing-bar. The latter is arranged in a vertical plane with the rear axle and above the same and is pivoted at its ends in raised bearings $f\,f$, secured to the upper side of the rear axle by clips $g$.

In order to allow the body of the vehicle to be carried as low as possible, and thus render the same convenient of access in stepping into said body and in alighting therefrom, I form the axle B with a depressed central or main portion and mount on the end portions of said axle the saddles H H, which extend, preferably, the entire length of said end portions of the axle and are rigidly secured thereto by clips or other suitable means. Over the depressed portion of the axle, preferably near the junctions thereof with the end portions of the axle, are posts H' H', rising from the saddles and formed integral therewith. The upper ends of said posts are provided with journal-bearings $f\,f$, which are axially parallel with the axle and in a vertical plane with the same, as shown in Figs. 4 and 5 of the drawings. Said bearings are provided with removable caps, and by means of clips $g$, bearing on said caps and extending down at opposite sides of the posts and axle and terminating with screw-threaded shanks passing through the bottom plates of the reaches C C and provided with nuts on their lower ends, the aforesaid caps, posts, axle, and reaches are firmly clamped together. The equalizing-bar D is mounted at opposite ends in the journal-bearings $f\,f$ and has affixed to it pendent shackle-ears $i\,i$, which hang, normally, in a slightly-forwardly inclined position over the depressed portion of the axle, inside of the posts H' H', and have coupled to them the rear ends of the side springs by means of bolts passing through the free ends of the ears $i\,i$ and through the usual eyes on the ends of the springs. By placing the bearings $f\,f$ over the depressed portion of the axle said bearings are brought nearer in line with the end portions of the axle, and this obviates in a great measure the cramping of the axle when the side springs are subjected to a load, and inasmuch as at this instance the shackle-ears *i i* are swung rearward to a vertical or nearly vertical position over the axle the aforesaid strain on the axle is still further guarded against. Said position of the shackle-ears is permitted by the hereinbefore-described position of the equalizing-bar in relation to the depressed central portion of the axle.

Vehicles of the class to which my invention pertains are always desired to present a light and neat appearance, and I therefore terminate the saddles H H with the posts H' H' at or near the junction of the depressed main or central portion of the axle and end portions thereof, and thus leave the said main portion of the axle bare, and in order to allow the same to be reduced to a minimum in diameter I truss the same by utilizing the equalizing-bar D as a strut, which is shouldered on the posts H' H' or on the bearings $ff$, as indicated at $j$, or otherwise in such a manner as to resist the inward strain of said posts, and thereby prevent the sagging of the central portion of the axle. The ends of the bar D may be made to protrude at the outer sides of the posts H' H' and screw-threaded and provided with nuts $j'$; but this last-described feature is not essential. If desired, the equalizing-bar may be arranged underneath the rear axle, as represented in Fig. 9, instead of above the same. In this case the bearings of the equalizing-bar are also located on the under side of the axle. In either of the described arrangements of the equalizing-bar the latter serves to brace the axle.

M M represent ferrules whereby the front ends of the side springs are attached to the front bolster. These ferrules each consist of a socket $m$, which fits over the end of the bolster, and a cylindrical extension $m'$, formed on the socket and provided in its under side with a cavity or recess $m^2$. The side spring is provided at its front end with an eye $n$, which is arranged in the recess of the ferrule and is held in the same by a horizontal bolt $o$, passing through the eye of the spring and a longitudinal opening $p$, formed in the ferrule extension, and entering a hole $p'$ in the end of the wooden bolster, as represented in Fig. 6. The bolt $o$ serves to secure the ferrule to the end of the bolster and also forms a support for the front end of the spring. The eye of the spring is concealed in the recess of the ferrule extension, whereby a sightly finish is produced, and as the eye of the spring bears against the sides of the recess $m^2$ the bolt is not so liable to become loose, as in the construction hitherto employed, in which the eye bears against the head of the bolt.

What I claim as my invention is—

1. The combination, with the axle, of saddles mounted rigidly on the end portions of the axle and terminating with posts formed integral with the saddles, and a bar connected at opposite ends to said posts and shouldered thereon to resist inward strain of said posts, and thereby brace the axle and side springs hung on said bar, as set forth.

2. The improved trussed running-gear consisting of the axle formed with a depressed central portion, saddles mounted rigidly on the end portions of said axle, rigid posts rising from said saddles, and a bar over the axle and in a vertical plane therewith and secured at opposite ends to the aforesaid posts and shouldered thereon to resist inward strain of the posts, as set forth.

3. The combination of the axle formed with a depressed central or main portion, posts rising from said portion and provided with journal-bearings approximately in line with the end portions of the axle, an equalizing and strut bar mounted in said journal-bearings, and side springs hung on said bar, as set forth.

4. The combination of the axle formed with a depressed central portion, saddles mounted rigidly on the end portions of said axle and terminating with posts near the junction of the depressed and end portions of the axle and integral with the saddles, journal-bearings on the posts approximately in line with the end portions of the axle, an equalizing and strut bar over the axle, mounted on the aforesaid journal-bearings, and having fixed shackle-ears at the inner sides of the aforesaid posts, and side springs hung on said equalizing-bar, substantially as described and shown.

5. The combination, with the axle B, reach C, saddle H, formed with the post H', journal-bearing $f$, and removable cap on said post, and the equalizing and strut bar D, mounted in said bearing, of the clip $g$, embracing and firmly tying said axle, reach, saddle, bearing, and cap together, substantially as described and shown.

6. The combination, with the front bolster and a side spring provided with an eye, of a ferrule having a socket fitting over the end of the bolster, and an extension formed on said socket and provided in its under side with a recess or cavity, in which the eye of the spring is arranged, and a bolt passing through the eye of the spring and the ferrule, substantially as set forth.

Witness my hand this 25th day of March, 1891.

THOMAS D. LINES.

Witnesses:
C. F. GEYER,
JENNIE CLOUGH.